Aug. 26, 1947.  K. W. COUSE  2,426,342
DRIVE WHEEL AND TRACTION BELT FOR ROAD VEHICLES
Filed Jan. 27, 1944  3 Sheets-Sheet 3
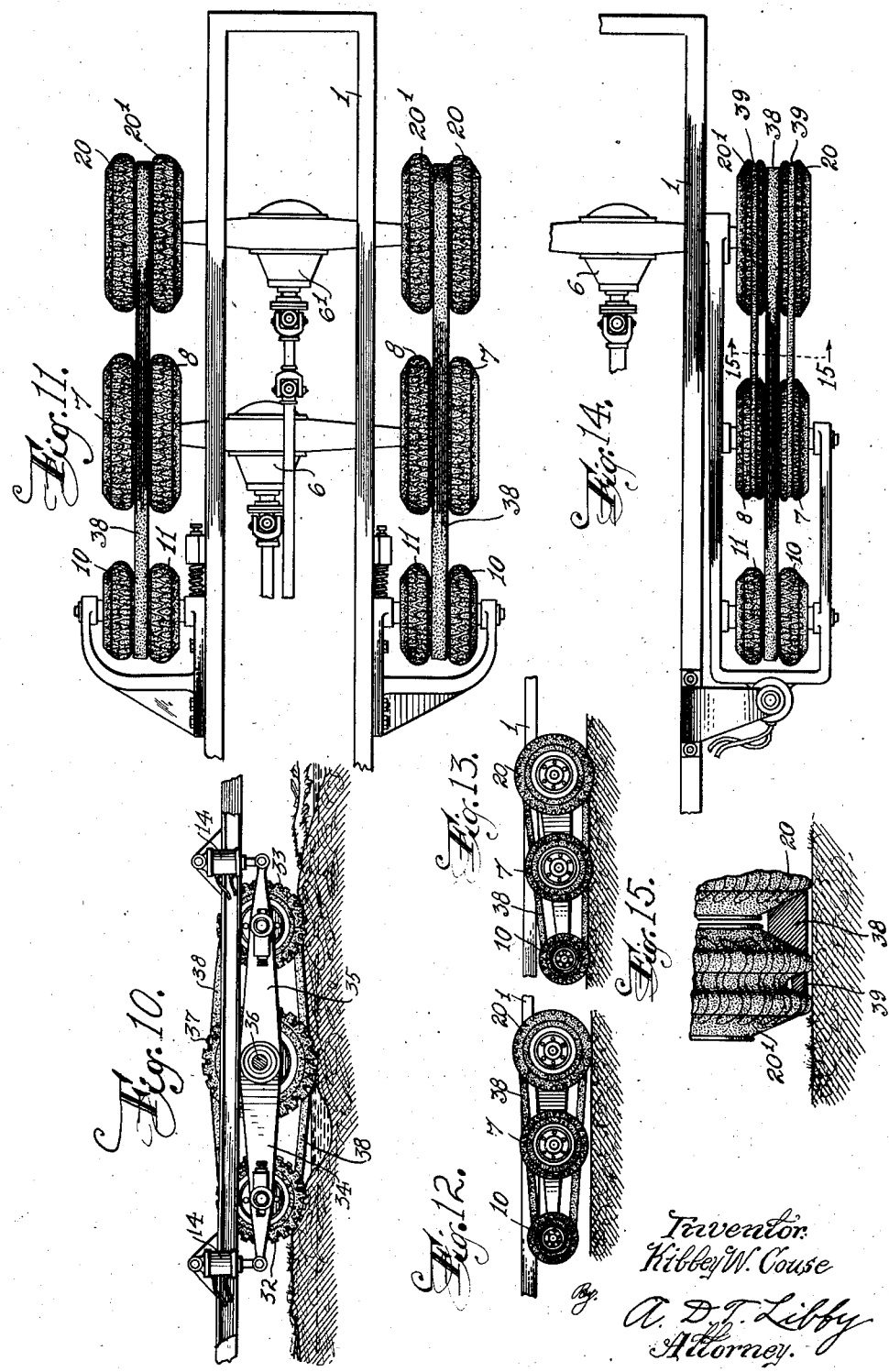

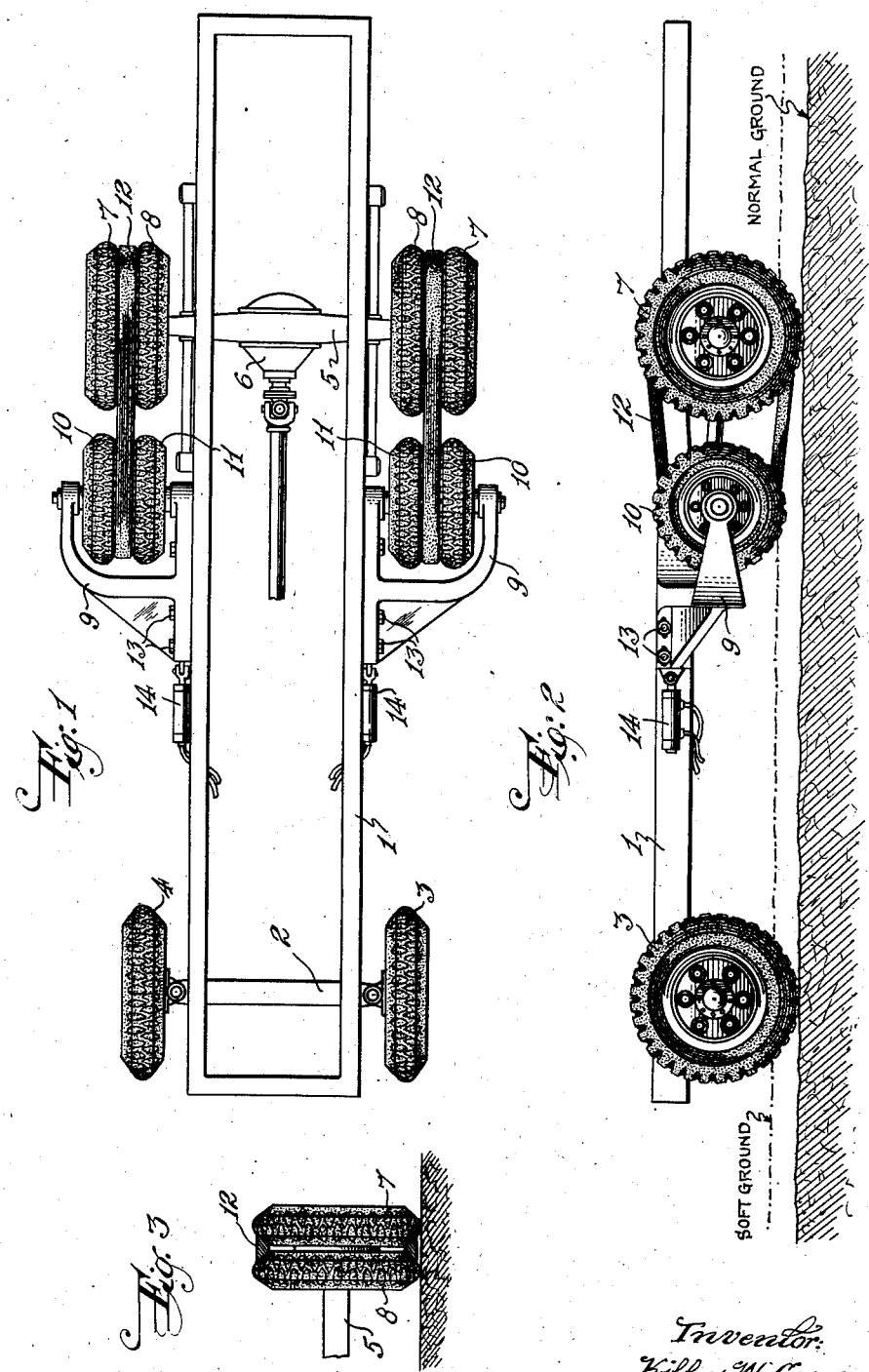

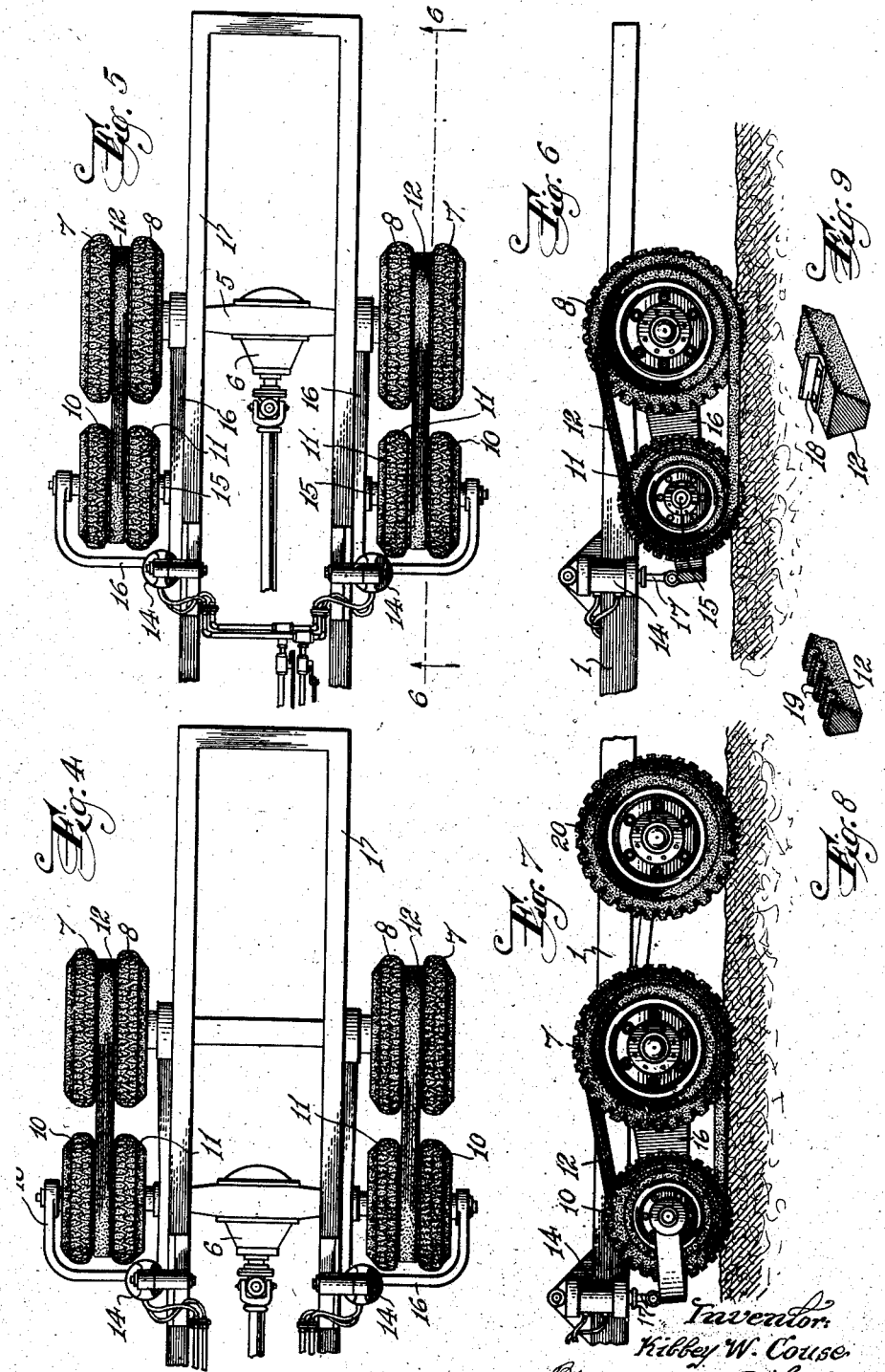

Patented Aug. 26, 1947

2,426,342

UNITED STATES PATENT OFFICE 2,426,342

DRIVE WHEEL AND TRACTION BELT FOR ROAD VEHICLES

Kibbey W. Couse, Newark, N. J.

Application January 27, 1944, Serial No. 519,847

8 Claims. (Cl. 180—9.1)

This invention relates to improvements in the construction of road vehicles, particularly those of the automotive type, and has for its principal object the obtaining of greater traction than is normally obtained by present standards of construction.

In building traveling machine shops such as shown in my Design Patent D. 109,942, issued May 31, 1938, and modifications thereof, a very much larger weight is applied to the chassis over and above that when the same chassis is used for standard truck work. Where these heavily loaded vehicles are to be operated through mud, snow or soggy conditions, I have found that some means of getting additional traction should be employed; hence, I have worked out various arrangements which are shown in the annexed drawings, and the advantages of which will be hereinafter set forth. In the drawings:

Figure 1 shows a skeleton plan view of a chassis wherein the front end, with its wheels, is of normal construction. At the rear of the chassis, two pairs of dual wheels are used on each side and each set is interconnected by a belt, the differential drive being on the rear set of wheels.

Figure 2 is a side view of Figure 1.

Figure 3 is a fragmentary view of one pair of the dual wheels showing the position of the belt shown in Figures 1 and 2.

Figure 4 is similar to Figure 1 as far as the position of the wheels and tires is concerned, but the drive of the differential is on the set of wheels forward of the rear sets which I term the idlers.

Figure 5 is a view similar to Figure 4, but showing the drive on the rear set of wheels, the same as in Figure 1.

Figure 6 is a view on the line 6—6 of Figure 5 with the forwardly positioned sets of wheels depressed to engage the terrain.

In Figures 4, 5 and 6, the forwardly positioned wheels, which I term the idlers, are mounted so that they may be lowered and raised for a purpose to be hereinafter explained.

Figure 7 shows a modification wherein an extra pair of drive wheels is mounted to the rear of those shown in Figure 6.

Figures 8 and 9 show modified forms of the V-belt used.

Figure 10 is a view showing idlers forwardly and rearwardly positioned of the main rear wheels, the idlers being independently adjustable about the axis of the main wheels.

Figure 11 shows a still further modified arrangement wherein four pairs of dual wheels are used, together with two pairs of idlers, all belted together on each side of the chassis.

Figure 12 is a side view on a reduced scale of the rear of Figure 11 with the tires in one position of operation.

Figure 13 is a view similar to Figure 12, but with the tires in full traction position.

Figure 14 is an arrangement similar to Figure 11, as far as the position of the tires is concerned, but with a different arrangement of belt drive.

Figure 15 is a somewhat enlarged view on the line 15—15 of Figure 14.

In the various views wherein like numbers refer to corresponding parts, 1 is a chassis having a front axle 2 with wheels 3 and 4, and a rear axle 5 with differential 6. The rear axle 5 has a pair of dual wheels 7 and 8 on each side of the chassis. Positioned longitudinally forwardly of the wheels 7 and 8, on each side of the chassis, and carried on a support member 9, are dual wheels 10 and 11. These wheels are normally idle as indicated in Figure 2. Positioned between the tires of the wheels 7 and 8, and 10 and 11, is a V-shaped belt 12 of suitable strong, flexible material, which frictionally engages the tires. When the tires are new, any irregularities of the tread along the side where the belt encounters the tires, will add to the effective gripping of the belt with the tires.

It will be seen from Figure 2, that when the vehicle is being driven on a hard surface, the major portion of the belt surface is out of contact with the terrain, but when soft ground is encountered, then the idler wheels and tires 10 and 11, together with the belt 12, come into engagement and supply additional traction. Preferably, the support 9 is adjustably mounted on the side of the chassis and when the studs or nuts 13 are loosened, the support 9 may be shifted by air or hydraulic pressure through the medium of the cylinder 14 to adjust the tension of the belt 12. While this description is directed to the wheels or tires, etc., on one side of the chassis, it of course applies to both sides.

In Figure 4, the drive from the differential 6 is indicated as being on the idlers 10 and 11, while in Figure 5 the differential drive is on the main rear wheels or tires 7 and 8; otherwise the two arrangements, as far as the tires are concerned, are the same.

In Figure 6 the idlers 10 and 11 are carried on a stub shaft 15 fastened to an arm 16 which is supported on some part of the rear axle housing for arcuate movement about the axes of the tires or wheels 7 and 8, and the member 16 is lowered and raised by hydraulic or air pressure through the medium of the device 14 having a plunger rod 17 fastened to the member 16. Where a hydraulic means is used, enormous pressure may be applied to the end of the arm 16 to force the tires 10 and 11 downwardly so as to bring these tires, together with the belt 12, into large surface engagement with the terrain. If necessary, the belt 12 may be equipped with metallic clips 18 as shown in Figure 9, or the outer surface may be made with tooth-like formations 19 as shown in Figure 8.

In Figure 7, the arrangement is the same as in Figure 6, with the addition of another set of wheels 20 on each side of the chassis, preferably of the dual type.

In Figure 10, fore and aft dual wheels 32 and 33 are carried, respectively, on arms 34 and 35 which are arcuately movable about the shaft 36 carrying main dual tires 37. Each of the arms 34 and 35 is adjustable by the air or hydraulic devices 14 to lower or raise these arms to bring the tires 32 and 33 into or out of engagement with the terrain. In this arrangement, the belt 38 is common to all three sets of tires on each side of the chassis.

In Figure 11, the arrangement is somewhat like that shown in Figure 7, except the extreme rear wheels 20 and 20' are connected by a common belt 38, the same as in Figure 10. The dual wheels 7 and 8, and 20 and 20' on each side are power-driven through their respective differentials 6 and 6'.

In Figure 12, the idlers 10 and 11 are farther off the terrain than 7 and 8, all the drive on the hard terrain being through the wheels 20 and 20'. However, when soft terrain is encountered, then the wheels take the position about as indicated in Figure 13.

In Figure 14, the arrangement is similar to that shown in Figure 11, except the tires 7, 8 and 20, 20' are provided with grooves, each, to receive an auxiliary belt 39.

While I have referred to the parts on which the belt 40 runs as pulley extensions, they may be the standard part of a dual wheel arrangement with a suitable fitting, if necessary, applied to receive a flat or V-belt.

From what has been said, it will be seen that I have provided various arrangements for increasing the traction of a road vehicle. Furthermore, certain of the arrangements are capable of high-speed travel under normal conditions, as well as being adaptable for heavy-duty work under adverse conditions of the terrain.

What I claim is:

1. In a road vehicle having a chassis carrying a power unit and a differential gearing to receive power from said unit with at least one pair of laterally spaced dual wheels and tires of the same diameter at the rear end of the chassis on each side thereof and arranged to receive power direct from said differential, means for increasing the traction of the vehicle including at least one pair of laterally spaced dual wheels and tires of equal diameter mounted on each side of the chassis longitudinally forwardly of said first mentioned dual wheels and a belt drive connecting said longitudinally spaced pairs of wheels, the forwardly positioned sets of wheels being arranged so they as well as the belts provide no driving contact on the terrain when the vehicle is travelling on hard terrain.

2. In a road vehicle having a chassis carrying a power unit and a differential gearing to receive power from said unit with at least one pair of spaced dual tired wheels at the rear of the chassis on each side thereof, and arranged to receive power direct from said differential, means for increasing the traction of the vehicle including at least one pair of dual tired wheels mounted on the chassis on each side thereof longitudinally forwardly of the first mentioned dual wheels but mounted so as to be normally out of engagement with any hard terrain on which the vehicle may be operated and belts extending between said sets of wheels on opposite sides of the chassis and engaging the sides of the tires below the treads thereof so the belts will transmit from the differential powered wheels substantially their full driving power to the forwardly disposed wheels without engagement with the terrain when the vehicle is traveling on hard terrain.

3. In a road vehicle having a chassis carrying a power unit and a differential gearing to transmit power from said unit directly to pairs of dual tired wheels on each side of the chassis, means for increasing the traction of the vehicle including at least one pair of dual tired wheels mounted on the chassis on each side thereof longitudinally forwardly of the first mentioned dual wheels but mounted so as to be normally out of engagement with any hard terrain on which the vehicle may be travelling and belts extending between said sets of wheels on opposite sides of the chassis drivingly engaging the sides of the tires of the dual wheels below the tire treads, the forwardly positioned wheels being adjustably mounted on the chassis.

4. In a road vehicle having a power unit connected to a differential with one pair of dual tired wheels at the rear of the vehicle chassis on each side thereof connected directly to the differential, means for increasing the traction of the vehicle including one pair of dual tired wheels mounted on the chassis forwardly of said one pair of dual wheels, and a belt extending between each set of wheels on opposite sides of the chassis and engaging the sides of the tires of the dual wheels below the tire treads to receive their full driving effect from the differential powered wheels, the forwardly positioned wheels being smaller in diameter than the rear wheels and mounted for arcuate movement about the axle of the rear wheels, and means for arcuately moving said smaller diameter wheels for the purpose described.

5. In a road vehicle having a power unit connected to a differential with one pair of dual wheels at the rear of the vehicle chassis on each side thereof connected directly to the differential, means for increasing the traction of the vehicle including one pair of wheels positioned forwardly and another pair of wheels positioned rearwardly of said dual wheels on each side of the chassis these last-mentioned pairs of wheels being smaller than said dual wheels, and mounted to arcuately move about the axis of the dual wheels, with means for arcuately moving them, and a belt drivingly connecting all the wheels for each side of the chassis.

6. In a road vehicle having a chassis carrying a power unit and a differential geared to receive power from said unit, with at least one pair of dual rear driving tired wheels for each side of the vehicle connected directly to the differential, means for increasing the traction of the vehicle including at least one pair of tired dual wheels mounted on the chassis on each side thereof in longitudinal spaced relation to said first mentioned pair and normally elevated above the tread of the first mentioned sets of wheel tires and belt drives connecting said pairs of wheels on each side of the chassis and engaging the sides of the tires below the treads thereof for their full driving power and out of contact with normal hard surface terrain when the vehicle is running thereover.

7. In a road vehicle having at least one pair of dual rear-driving tired wheels for each side of the vehicle, means for increasing the traction of the vehicle, said means including at least one pair of dual wheels of equal diameter mounted on the chassis in longitudinally spaced relation to said first-mentioned pair, and a belt drive connecting said pairs of wheels, said pairs of wheels being of the dual type and the belt being of the V type to engage only the sides of the dual tires radially inwardly of the normal tread of the tires and out of contact with normal hard surface terrain when the vehicle is running thereover.

8. In a road vehicle having a plurality of dual tired wheels arranged in longitudinal spaced relation on each side of the rear of the vehicle chassis, those at the rear being similar and equal in size and having the largest diameter, while those forwardly of the rear wheels are of the same size in pairs but of smaller diameter than the rear wheels, belt means connecting all of said wheels on each side of the chassis and having their entire power contact with the sides of the tires below the treads thereof, the said smaller diameter wheels and belt being normally out of contact with the terrain but brought into contact with the terrain as the extreme rear wheels sink into it.

KIBBEY W. COUSE.

REFERENCES CITED

The following references are of record in the file of this patent:

UNITED STATES PATENTS

| Number | Name | Date |
|---|---|---|
| 1,183,669 | Rider | May 16, 1916 |
| 1,450,643 | Platt | Apr. 3, 1923 |
| 1,639,536 | Saives | Aug. 16, 1927 |
| 1,105,862 | Strait | Aug. 4, 1914 |
| 1,397,139 | Muscott | Nov. 15, 1921 |

FOREIGN PATENTS

| Number | Country | Date |
|---|---|---|
| 293,078 | Great Britain | July 4, 1928 |
| 490,463 | Great Britain | Aug. 12, 1938 |
| 822,071 | France | Sept. 6, 1937 |
| 132,171 | Switzerland | June 1, 1929 |